US012713352B2

(12) United States Patent
Hooli et al.

(10) Patent No.: US 12,713,352 B2
(45) Date of Patent: Aug. 18, 2026

(54) TRANSMISSION AND MONITORING OF LOW-POWER WAKE-UP SIGNALS

(71) Applicant: Nokia Technologies Oy, Espoo (FI)

(72) Inventors: Kari Juhani Hooli, Oulu (FI); Esa Tapani Tiirola, Oulu (FI); Pasi Eino Tapio Kinnunen, Oulu (FI); Sami-Jukka Hakola, Oulu (FI); Ganesh Venkatraman, Oulu (FI); Jorma Johannes Kaikkonen, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 270 days.

(21) Appl. No.: 18/394,722

(22) Filed: Dec. 22, 2023

(65) Prior Publication Data

US 2024/0276379 A1 Aug. 15, 2024

(30) Foreign Application Priority Data

Feb. 13, 2023 (FI) ...................................... 20235142

(51) Int. Cl.
*H04W 52/02* (2009.01)
*H04L 1/00* (2006.01)
(Continued)

(52) U.S. Cl.
CPC ....... *H04W 52/0235* (2013.01); *H04L 1/0067* (2013.01); *H04W 56/0015* (2013.01); *H04W 72/1273* (2013.01)

(58) Field of Classification Search
None
See application file for complete search history.

(56) References Cited

U.S. PATENT DOCUMENTS 9,014,070 B2 * 4/2015 Guey .................... H04W 76/28 370/311
9,307,493 B2 * 4/2016 Backholm ......... H04W 52/0251
(Continued)

FOREIGN PATENT DOCUMENTS

| | | | |
|---|---|---|---|
| EP | 3866539 | A1 | 8/2021 |
| WO | 2018/084495 | A1 | 5/2018 |
| WO | 2022/170247 | A1 | 8/2022 |

OTHER PUBLICATIONS

"3rd Generation Partnership Project; Technical Specification Group Radio Access Network; Study on support of reduced capability NR devices (Release 17)", 3GPP TS 38.875, V17.0.0, Mar. 2021, pp. 1-135.

(Continued)

*Primary Examiner* — Melvin H Pollack
(74) *Attorney, Agent, or Firm* — Robert P. Michal, Esq.; Rimon PC

(57) ABSTRACT

There is provided an apparatus comprising: at least one processor; and at least one memory storing instructions that, when executed by the at least one processor, cause the apparatus at least to perform: monitoring, in an inactive mode, low power wake-up signal, LP-WUS, occasions for detecting a transmission on a LP-WUS occasion, the transmission comprising: a first signature indicating presence of at least one LP-WUS message in the transmission and the at least one LP-WUS message; or a second signature indicating absence of a LP-WUS message in the transmission.

1 Claim, 7 Drawing Sheets

(51) Int. Cl.
*H04W 56/00* (2009.01)
*H04W 72/1273* (2023.01)

(56) References Cited

U.S. PATENT DOCUMENTS

| | | | | |
|---|---|---|---|---|
| 9,954,692 | B2 * | 4/2018 | Brandt | H04L 65/70 |
| 10,880,895 | B2 * | 12/2020 | Gordaychik | H04L 1/1854 |
| 11,057,832 | B2 * | 7/2021 | Kim | H04W 52/0241 |
| 11,070,949 | B2 * | 7/2021 | Gross | G06F 3/0488 |
| 11,102,755 | B2 * | 8/2021 | Wong | H04W 68/025 |
| 11,439,344 | B2 * | 9/2022 | Zhang | G16H 40/67 |
| 11,647,463 | B2 * | 5/2023 | Azizi | H04W 52/0229 370/311 |
| 11,706,716 | B1 * | 7/2023 | Wu | H04L 1/201 370/311 |
| 11,711,766 | B2 * | 7/2023 | Awoniyi-Oteri | H04W 52/0229 370/318 |
| 11,722,960 | B2 * | 8/2023 | Freda | H04W 52/0229 370/311 |
| 11,956,822 | B2 * | 4/2024 | Deenoo | H04L 5/005 |
| 12,010,540 | B2 * | 6/2024 | Xiong | H04W 24/10 |
| 12,041,552 | B2 * | 7/2024 | Nam | H04W 76/28 |
| 12,101,843 | B2 * | 9/2024 | Santhanam | H04W 24/08 |
| 12,207,188 | B2 * | 1/2025 | Abotabl | H04W 52/028 |
| 12,262,443 | B2 * | 3/2025 | Manolakos | H04L 5/0051 |
| 12,328,676 | B2 * | 6/2025 | Xu | H04W 52/0235 |
| 12,356,330 | B2 * | 7/2025 | Ali | H04W 52/0229 |
| 12,425,968 | B2 * | 9/2025 | Yapici | H04W 12/106 |
| 2020/0154355 | A1 * | 5/2020 | Nam | H04W 52/0229 |
| 2021/0127335 | A1 | 4/2021 | Rostami et al. | |
| 2021/0227470 | A1 | 7/2021 | Awoniyi-Oteri et al. | |
| 2021/0297987 | A1 | 9/2021 | Hwang et al. | |
| 2022/0248327 | A1 | 8/2022 | Yang et al. | |
| 2023/0063026 | A1 * | 3/2023 | Reial | H04W 52/0235 |
| 2023/0189147 | A1 * | 6/2023 | Bala | H04W 68/02 370/311 |
| 2023/0224953 | A1 * | 7/2023 | Xiong | H04L 1/0009 370/329 |
| 2024/0007950 | A1 * | 1/2024 | Liao | H04W 52/0212 |
| 2024/0147370 | A1 * | 5/2024 | Mahalingam | H04W 52/0219 |
| 2024/0172272 | A1 * | 5/2024 | Xiong | H04L 1/189 |
| 2024/0215067 | A1 * | 6/2024 | Elkotby | H04W 74/08 |
| 2024/0276364 | A1 * | 8/2024 | Elshafie | H04W 52/0206 |
| 2025/0008435 | A1 * | 1/2025 | Garcia | H04W 56/0015 |
| 2025/0261117 | A1 * | 8/2025 | Cheng | H04W 76/28 |
| 2025/0342832 | A1 * | 11/2025 | Puvvadi | G10L 25/90 |

OTHER PUBLICATIONS

"New SID: Study on low-power Wake-up Signal and Receiver for NR", 3GPP TSG RAN meeting #94e, RP-213645, Agenda: 8A.1, vivo, Dec. 6-17, 2021, 4 pages.

"Motivation for new study item on ultra-low power wake up signal in Rel-18", 3GPP TSG RAN Rel-18 workshop, RWS-210168, Agenda: 4.3, vivo, Jun. 28-Jul. 2, 2021, 13 pages.

"IEEE Standard for Information Technology Telecommunications and Information Exchange between Systems Local and Metropolitan Area Networks—Specific Requirements, Part 11: Wireless LAN Medium Access Control (MAC) and Physical Layer (PHY) Specifications, Amendment 3: Wake-Up Radio Operation", IEEE Computer Society, IEEE Std 802.11ba™—2021, Mar. 2021, 180 pages.

"IEEE 802.11", Wikipedia, Retrieved on Jan. 19, 2024, Webpage available at : https://en.wikipedia.org/wiki/IEEE_802.11.

"Summary #2 of discussions on L1 signal design and procedure for low power", 3GPP TSG RAN WG1 #111, R1-2212866, Agenda: 9.13.3, Nordic, Nov. 14-18, 2022, 60 pages.

"L1 signal design and procedure for low power WUS", 3GPP TSG-RAN WG1 Meeting #111, R1-2212160, Agenda: 9.13.3, Ericsson, Nov. 14-18, 2022, pp. 1-6.

"3rd Generation Partnership Project; Technical Specification Group Radio Access Network; NR; Physical channels and modulation (Release 17)", 3GPP TS 38.211, V17.4.0, Dec. 2022, pp. 1-136.

"3rd Generation Partnership Project; Technical Specification Group Radio Access Network; NR; Multiplexing and channel coding (Release 17)", 3GPP TS 38.212, V17.4.0, Dec. 2022, pp. 1-202.

"3rd Generation Partnership Project, Technical Specification Group Radio Access Network; NR; Physical layer procedures for control (Release 17)", 3GPP TS 38.213, V17.4.0, Dec. 2022, pp. 1-258.

"3rd Generation Partnership Project; Technical Specification Group Radio Access Network; NR; Physical layer procedures for data (Release 17)", 3GPP TS 38.214, V17.4.0, Dec. 2022, pp. 1-230.

"3rd Generation Partnership Project; Technical Specification Group Radio Access Network; NR; Physical layer measurements (Release 17)", 3GPP TS 38.215, V17.2.0, Sep. 2022, pp. 1-26.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

Office action received for Finnish Patent Application No. 20235142, dated Sep. 20, 2023, 15 pages.

"Discussion on physical signal and procedure for low power WUS", 3GPP TSG RAN WG1 #110-bis-e, R1-2208670, Agenda: 9.13.3, Vivo, Oct. 10-19, 2022, 10 pages.

"Final summary of discussions on LI signal design and procedure for low power WUS", 3GPP TSG RAN WG1 #111, R1-2212978, Agenda: 9.13.3, Nordic, Nov. 14-18, 2022, 61 pages.

* cited by examiner

Figure 4:
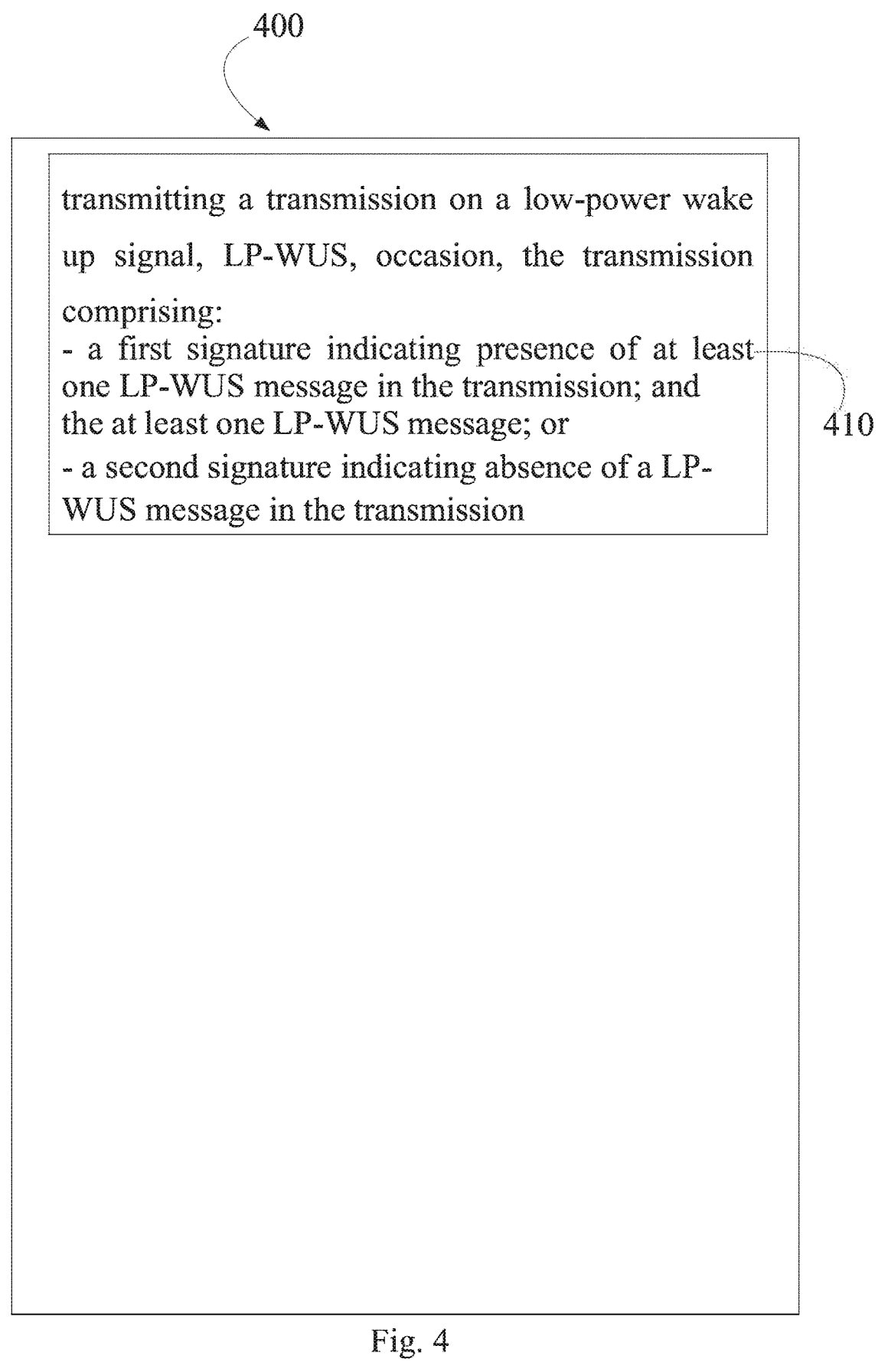

400 transmitting a transmission on a low-power wake up signal, LP-WUS, occasion, the transmission comprising:
- a first signature indicating presence of at least one LP-WUS message in the transmission; and the at least one LP-WUS message; or
- a second signature indicating absence of a LP-WUS message in the transmission

TRANSMISSION AND MONITORING OF LOW-POWER WAKE-UP SIGNALS

FIELD

Various example embodiments relate to transmission and monitoring of low-power wake-up signals.

BACKGROUND

Connected devices, such as internet of things (IoT) devices, wearable devices and other smart devices have battery life time targets of weeks or even years. These power-sensitive devices may be in sleep mode, when they don't need to communicate with other devices or network.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to an aspect, there is provided a method comprising: monitoring, in an inactive mode, low power wake-up signal, LP-WUS, occasions for detecting a transmission on a LP-WUS occasion, the transmission comprising: a first signature indicating presence of at least one LP-WUS message in the transmission and the at least one LP-WUS message; or a second signature indicating absence of a LP-WUS message in the transmission. The method may be performed by a user equipment.

According to an embodiment, the transmission comprises the first signature, the apparatus is caused to perform: detecting the first signature; and based on detecting the first signature, monitoring the at least one LP-WUS message in a remaining portion of the LP-WUS occasion.

According to an embodiment, the method comprises: receiving the at least one LP-WUS message instructing to wake-up; and switching to an active mode.

According to an embodiment, the method comprises: updating synchronization of the apparatus based on at least one of: the first signature or the at least one LP-WUS message; and/or updating a metric for LP-WUS coverage estimation based on at least one of: the first signature or the at least one LP-WUS message.

According to an embodiment, the transmission comprises the second signature, the method comprises: detecting the second signature; and based on detecting the second signature, ignoring a remaining portion of the LP-WUS occasion.

According to an embodiment, the method comprises: updating synchronization of the apparatus based on the second signature; and/or updating a metric for LP-WUS coverage estimation based on the second signature.

According to an embodiment, the method comprises: after not detecting either of the first signature and the second signature, updating a metric for LP-WUS coverage estimation.

According to an embodiment, the method comprises: based on detecting, based on a metric for LP-WUS coverage estimation, that the apparatus is outside the LP-WUS coverage, switching to active mode; triggering a LP-WUS mobility event; or indicating to a network node that the apparatus has not received LP-WUS message(s) or either of the first signature and the second signature.

According to an embodiment, an opportunity for detecting the first signature is provided for each LP-WUS occasion; and an opportunity for detecting the second signature is provided for a pre-defined subset of the LP-WUS occasions.

According to an aspect, there is provided an apparatus comprising means for performing the method of the aspect above and any of the embodiments thereof. The apparatus may be a user equipment.

According to an embodiment, the means comprises at least one processor; and at least one memory storing instructions that, when executed by the at least one processor, cause the performance of the apparatus. The apparatus may be a user equipment.

According to an aspect, there is provided a (non-transitory) computer readable medium comprising instructions that when executed by an apparatus, cause the apparatus to perform the method of the aspect above and any of the embodiments thereof. The apparatus may be a user equipment.

According to an aspect, there is provided a computer program comprising instructions, which, when executed by an apparatus, cause the apparatus to perform the method of the aspect above and any of the embodiments thereof. The apparatus may be a user equipment.

According to an aspect, there is provided a method comprising: transmitting a transmission on a low-power wake up signal, LP-WUS, occasion, the transmission comprising: a first signature indicating presence of at least one LP-WUS message in the transmission and the at least one LP-WUS message; or a second signature indicating absence of a LP-WUS message in the transmission. The method may be performed by a network node.

According to an embodiment, the transmission comprises the first signature, which is transmitted over a different carrier frequency or bandwidth part than the at least one LP-WUS message.

According to an embodiment, the transmission comprises the first signature and the at least one LP-WUS message comprising instruction for a user equipment in an inactive mode to wake up.

According to an embodiment, the method comprises: transmitting a configuration to at least one user equipment in connected mode, wherein the configuration comprises configuration of resources allocated for the at least one LP-WUS message as rate matching resources for the at least one user equipment in connected mode.

According to an embodiment, the transmission comprises the second signature, and the method comprises: indicating, to the at least one user equipment in connected mode, that the resources allocated for the at least one LP-WUS message are used for physical downlink shared channel, if resources allocated for the physical downlink shared channel overlap with the resources allocated for the at least one LP-WUS message.

According to an embodiment, the method comprises: receiving, from a user equipment, an indication that the user equipment is outside the LP-WUS coverage; and based on the indication, transmitting to the user equipment at least one LP-WUS message comprising instruction to wake up; or providing the user equipment with LP-WUS configuration with wider coverage.

According to an aspect, there is provided an apparatus comprising means for performing the method of the aspect above and any of the embodiments thereof. The apparatus may be a network node.

According to an embodiment, the means comprises at least one processor; and at least one memory storing instructions that, when executed by the at least one processor, cause the performance of the apparatus. The apparatus may be a network node.

According to an aspect, there is provided a (non-transitory) computer readable medium comprising instructions that when executed by an apparatus, cause the apparatus to perform the method of the aspect above and any of the embodiments thereof. The apparatus may be a network node.

According to an aspect, there is provided a computer program comprising instructions, which, when executed by an apparatus, cause the apparatus to perform the method of the aspect above and any of the embodiments thereof. The apparatus may be a network node.

BRIEF DESCRIPTION OF THE DRAWINGS

Some example embodiments will now be described with reference to the accompanying drawings.

FIG. 4 shows, by way of example, a flowchart of a method;

DETAILED DESCRIPTION

Figure 1:
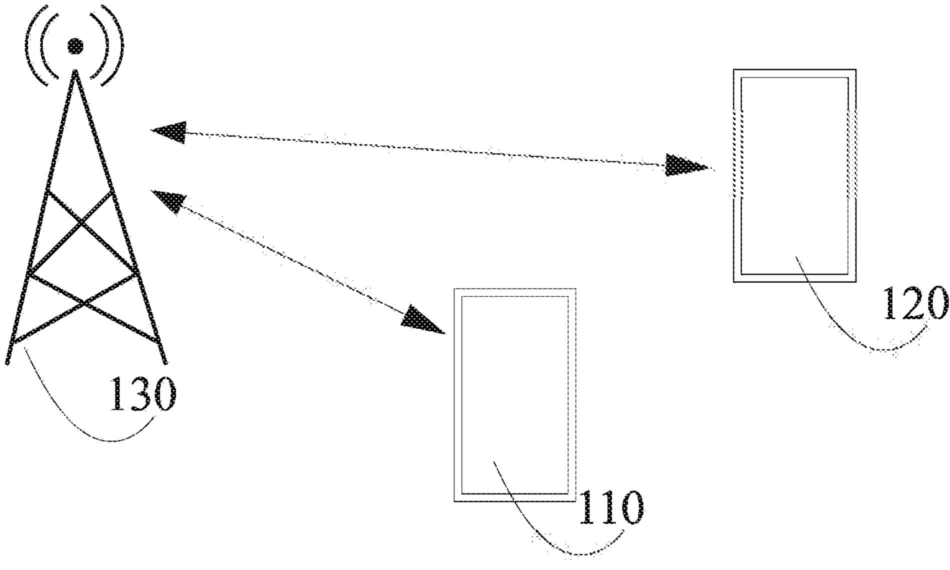
FIG. 1 shows, by way of example, a communication system with a base node and user equipments.

FIG. 1 shows, by way of example, a communication system with a base node 130 and user equipments 110, 120. A base node 130, such as a cellular base station 130, is configured to operate based on a suitable technical standard, such as long term evolution, LTE, fifth generation, 5G, or 6G, for example. A base station may be referred to as a radio node, network node, node, eNode B, eNB, gNB network device. The base station may comprise a centralized unit, gNB-CU, and one or more distributed units, gNB-DU. A gNB-CU and gNB-DU(s) may be connected using e.g. an F1 interface. Another term for 5G is new radio, NR. A yet further example of a suitable technical standard is 5G-Advanced. Alternatively, base node 130 may be a non-cellular base node, such as, for example, a wireless local area network, WLAN, or worldwide interoperability for microwave access, WiMAX, access point.

In addition to base node 130, the system of FIG. 1 includes use equipments, e.g. user equipments, UEs, 110, 120. A UE may be referred to as a terminal, a terminal device, a user device or simply a device. The UEs 110, 120 comprise a wireless transceiver configured to communicate using a cellular or non-cellular radio technology, such as one of those mentioned above, for example, to obtain interoperation with base node 130. A user equipment 110, 120 may comprise, for example, an Internet of Things, IoT, node, such as a sensor node, or a utility meter which is not an IoT node. The UE may comprise a sensor, actuator, wearable device such as a smart watch, ring, eHealth related device, or a medical monitoring device. UEs 110, 120 suitable for use with the presently disclosed mechanisms may be optimized for low power consumption. UEs may require latency-critical services. The UEs may be configured to provide, for example, an uplink transmission to base node 130 when requested, or according to a pre-configured time schedule for reporting. The uplink transmission may comprise sensor data generated by the respective UE 110, 120, or mesh-network data, for example, received in the UEs 110, 120 from further devices, which are not illustrated in FIG. 1 for the sake of clarity of the illustration.

UEs 110, 120 are configured to spend time in an energy saving state when not transmitting or receiving via the wireless transceiver. The energy saving state comprises that the wireless transceiver of UEs 110, 120 is in a low-power state. The low-power state of the wireless transceiver may be one where the wireless transceiver is switched off, or placed in a hibernated or otherwise inactive state where the wireless transceiver does not monitor for incoming transmissions and does not transmit signals. Further examples of names used of the hibernated or inactive state are discontinuous reception, DRX, sleep state, DRX-Off state, radio resource control idle, RRC_Idle, and RRC_Inactive state or inactive mode.

The energy saving state may be extensive and extend also to other systems of UE 110, 120 than the wireless transceiver. UEs 110, 120 may be powered by a non-rechargeable battery, which aims to power the UEs 110, 120 for weeks, months, or even years, wherefore optimization of power consumption needs to be conducted carefully. In particular, monitoring for transmissions using a cellular or non-cellular radio technology such as the ones mentioned above, for example, consumes necessarily so much power that in the UEs 110, 120 of FIG. 1, these radio technologies are not used in the energy saving state. To enable communication with a UE 110, 120 in the energy saving state, the UEs 110, 120 are equipped with a wireless receiver, which is separate from the wireless transceiver, which is usable with the cellular or non-cellular technology to receive modulated payload data from the wireless communication system. Base node 130 may provide a signal, such as a wake-up signal, that the wireless receiver is configured to detect. The wireless receiver may be referred to, for example, as a low-power receiver, an ultra-low power receiver or a wake-up receiver, WUR, e.g. a low-power WUR (LP-WUR). Responsive to the signal, the UE that received the signal switches its wireless transceiver from the low-power state to an active state. Examples of the active state include RRC_Active, DRX-On and DRX-Active. In the active state, the wireless transceiver is able to receive and/or transmit information based on the cellular or non-cellular radio technology that the UE is configured to use. Initially in the active state, the device may be in an RRC_Idle state, from which an RRC connection may be established whereby the state is switched to RRC_Connected. The wireless transceiver is the main radio of the UE. The separate wireless receiver is used to receive the signal to end the energy saving state of the main radio.

Figure 2:
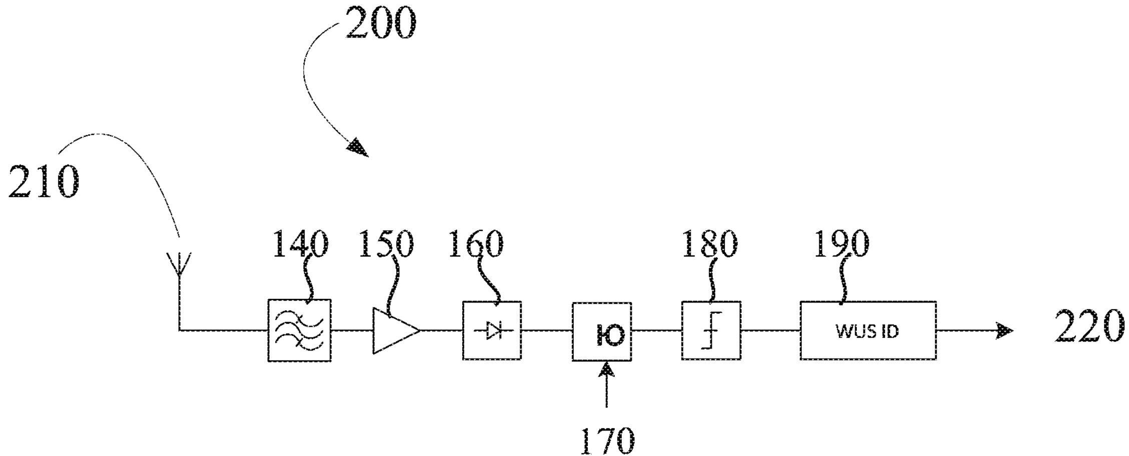
FIG. 2 shows, by way of example, a wireless receiver and a user equipment comprising the wireless receiver.
Figure 2:
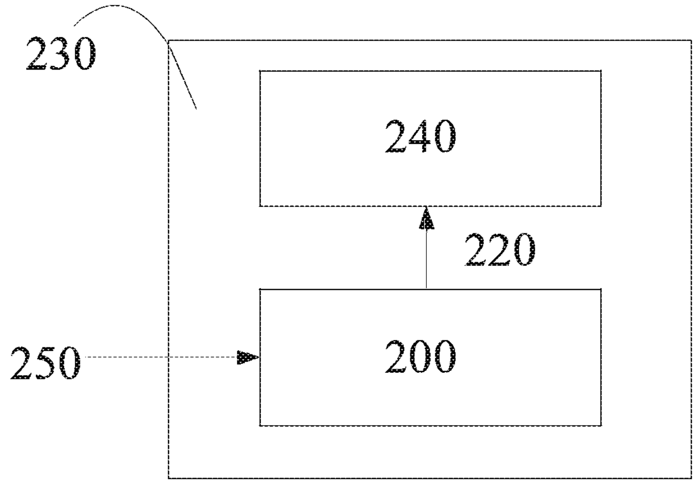

FIG. 2 shows, by way of example, a wireless receiver, e.g. a low-power wake-up receiver 200 and a UE 230 comprising the wireless receiver. The wireless receiver 200 is suitable for receiving the wake-up signal from base node 130. A signal, such as a signal based on using on-off keying, OOK, or MC-OOK, is provided from a receive antenna 210 to a band-pass filter 140, thence to a low-noise amplifier 150, thence to an envelope detector 160, thence to an integrator 170 which is configured to reset at a symbol time interval. The integrator 170 provides its output to a comparator 180, which in turn provides its output to a correlator 190 which detects whether a specific wake-up signal, identified with a wake-up signal identity, WUS ID, has been detected. If this is the case and the UE is configured to respond to this specific wake-up signal, then a signal 220 is provided which switches on the wireless transceiver, which is the main radio of the UE, as noted above. After the envelope detector 160, the signal will be a low frequency signal being either low when a 0 is received or high when a 1 is received. By integrating the signal over each symbol duration, the signal noise is suppressed, and the comparator 180 can then determine if the received symbol is a 0 or 1 by comparing with the average signal level. Finally, in correlator 190 the detected bit sequence is correlated with the expected signal (LP-WUS message).

An advantage of the receiver illustrated in FIG. 2 is that it does not require a mixer, an analogue-to-digital converter or advanced baseband processing, making it inherently a very power-efficient solution. In practice such receivers may be more complex than the one illustrated, but FIG. 2 demonstrates that the receiver ideally may be very simple, which is why OOK and multicarrier OOK, MC-OOK, are attractive modulation schemes to select when designing the signal to be sent to the wireless receiver.

To summarize, the main radio 240 of the UE 230 may be in a sleep mode or even powered off to save power, and may be activated upon the reception of the wake-up signal 250 from the network. The network may trigger the UE to wake-up in an event-driven manner by transmitting a LP-WUS 250 to the UE 230. Wake-up signals are monitored at the UE by a LP-WUR, e.g. by the LP-WUR 200 of FIG. 2. When the UE 230 receives the LP-WUS by the LP-WUR 200, the LP-WUR may trigger with signal 220 the wake-up of the main radio 240 of the UE and communication with the network may start.

To maintain communication latency that would be reasonable for various services, including latency-critical services, network may need to reserve resources for rather frequent LP-WUS signalling. If the resources reserved for LP-WUS are away or excluded from NR downlink (DL) transmissions, considerable overhead would be caused for the NR operations. On other hand, in significant portion of wake-up signalling occasions, or even in most of the wake-up signalling occasions, there are no actual wake-up signals to be transmitted.

In the absence of wake-up signal, resources allocated for the LP-WUS could be reused for NR DL communication. However, as transmission (Tx) energy of NR transmissions may fluctuate, false alarms of LP-WUS may be increased, which in turn causes unnecessary increase in UE power consumption, since the main radio would be triggered to wake up for paging detection or random access in vain. Especially, when detecting signals with a simple LP-WUS envelope detector, as in the WUR 200 of FIG. 2, false alarms may be increased.

Method(s) are provided to facilitate reusing LP-WUS resources for NR communications without increasing LP-WUS false alarm rate.

Figure 3:
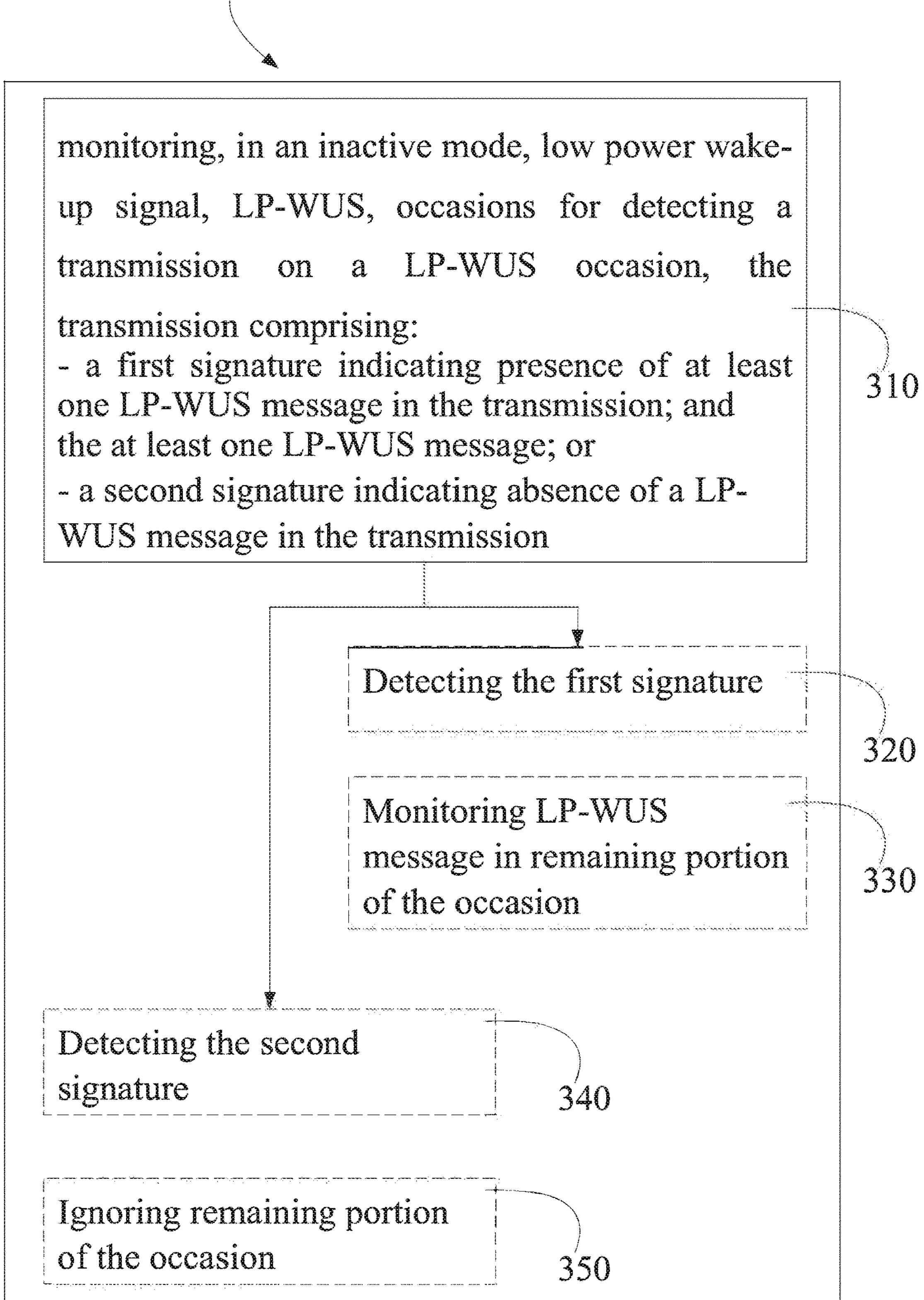
FIG. 3 shows, by way of example, a flowchart of a method.

FIG. 3 shows, by way of example, a flowchart of a method 300. The phases of the illustrated method may be performed by a UE, or by a control device configured to control the functioning thereof, when installed therein. The UE may be, for example, the device 110, 120 of FIG. 1 or device 230 of FIG. 2, which is configured to perform at least the method 300. The method 300 comprises monitoring 310, in an inactive mode, low power wake-up signal, LP-WUS, occasions for detecting a transmission on a LP-WUS occasion. The transmission may comprise a first signature indicating presence of at least one LP-WUS message in the transmission; and the at least one LP-WUS message 250. Alternatively, the transmission may comprise a second signature indicating absence of a LP-WUS message in the transmission.

FIG. 4 shows, by way of example, a flowchart of a method 400. The phases of the illustrated method may be performed by a network node, or by a control device configured to control the functioning thereof, when installed therein. The network node may be, for example, the base station 130 of FIG. 1, which is configured to perform at least the method 400. The method 400 comprises transmitting 410 a transmission on a low-power wake up signal, LP-WUS, occasion. The transmission may comprise a first signature indicating presence of at least one LP-WUS message in the transmission; and the at least one LP-WUS message. Alternatively, the transmission may comprise a second signature indicating absence of a LP-WUS message in the transmission.

The method(s) as disclosed herein enable the UE to be aware of whether to expect the actual LP-WUS message or not. If the LP-WUS occasion does not include the actual LP-WUS message, the network may reuse those resources, which have been allocated for the LP-WUS, for NR communications to some other device(s), which is/are in connected mode, e.g. RRC connected NR mode. When the UE is aware of that, the UE can avoid false interpretation of NR communication as a LP-WUS. The method(s) as disclosed herein enable reducing LP-WUS overhead, while maintaining reasonable communication latency for LP-WUS. The method(s) as disclosed herein facilitate the reuse of LP-WUS resource for NR communications without increasing considerably LP-WUS false alarm rate.

Referring back to FIG. 3, the method 300 may comprise, wherein the transmission comprises the first signature, detecting 320 the first signature. The method 300 may comprise after or based on detecting the first signature, monitoring 330 the at least one LP-WUS message in a remaining portion of the LP-WUS occasion.

Wherein the transmission comprises the second signature, the method 300 may comprise detecting 340 the second signature. The method 300 may comprise after or based on detecting the second signature, ignoring 350 the remaining portion of the LP-WUS occasion.

Figure 5:
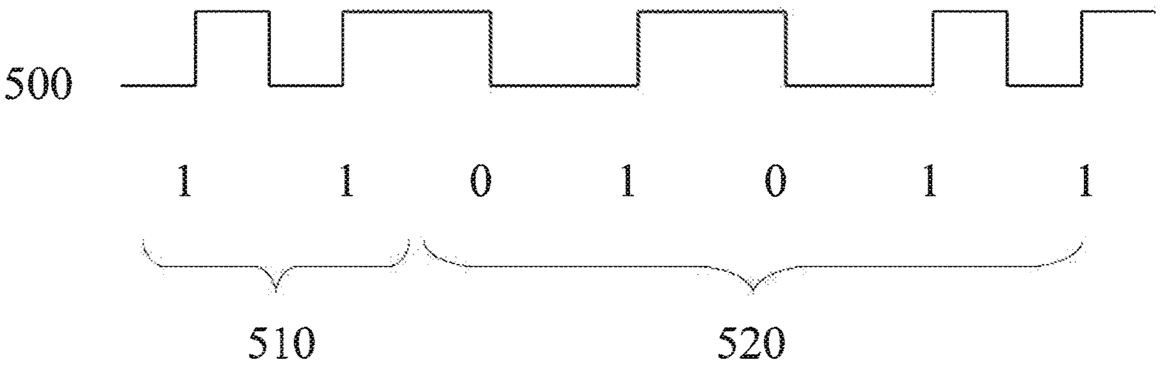
FIG. 5 shows, by way of example, transmissions with a first signature and a second signature.
Figure 5:
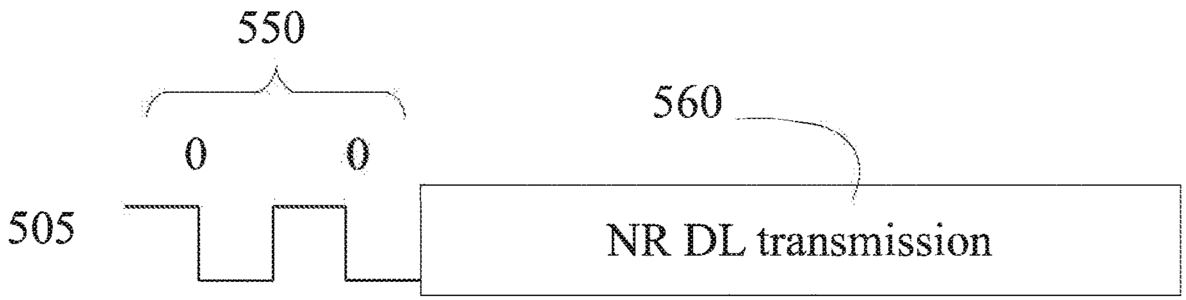

FIG. 5 shows, by way of example, transmissions with a first signature 510 and a second signature 550. Transmission 500 above comprises the first signature 510, which indicates presence of at least one LP-WUS message 520 (e.g. LP-WUS 250) in the transmission 500. The transmission 500 may comprise a plurality of elements for LP-WUS message, e.g. WUS message 1, WUS message 2, . . . , WUS message N.

Transmission 505 below comprises the second signature 550, which indicates absence of LP-WUS message in the transmission. Instead, the resources reserved for transmission of LP-WUS message(s) may be used for NR DL transmission 560.

The LP-WUS signature pair (first signature and a second signature) may be used to indicate the presence or absence of the actual LP-WUS message. For example, the first signature 510 and the second signature 550 may be two different values of a WUS, or two different states of a WUS, or two different sequences of a WUS. In the example of FIG.

5, value 1 corresponds to the first signature 510 indicating presence of the LP-WUS message 520, and value 0 corresponds to the second signature 550 indicating absence of the LP-WUS message.

For example, the first signature may be referred to as a first WUS and the actual LP-WUS message may be referred to as a second WUS. The second WUS may follow the first WUS, or the first WUS may be embedded to the second WUS, or the first WUS and the second WUS may be two different fields of a single WUS message, for example.

Signature candidates of the signature pair may be common to a cell or a cell group. Signature candidates may be semi-static signals, which may be transmitted on a portion of the overall LP-WUS occasion. The signature candidates may be selected to optimize the detection probability. For example, it may be determined that there would be maximal distance between the first signature and the second signature, e.g. in terms of energy at the output of the envelope detector 160 or Euclidean distance for complex detector, to improve detection reliability.

How the UE will function, when detecting the first signature or the second signature, or when not detecting either of the signatures, will be described in the context of FIG. 6.

Figure 6:
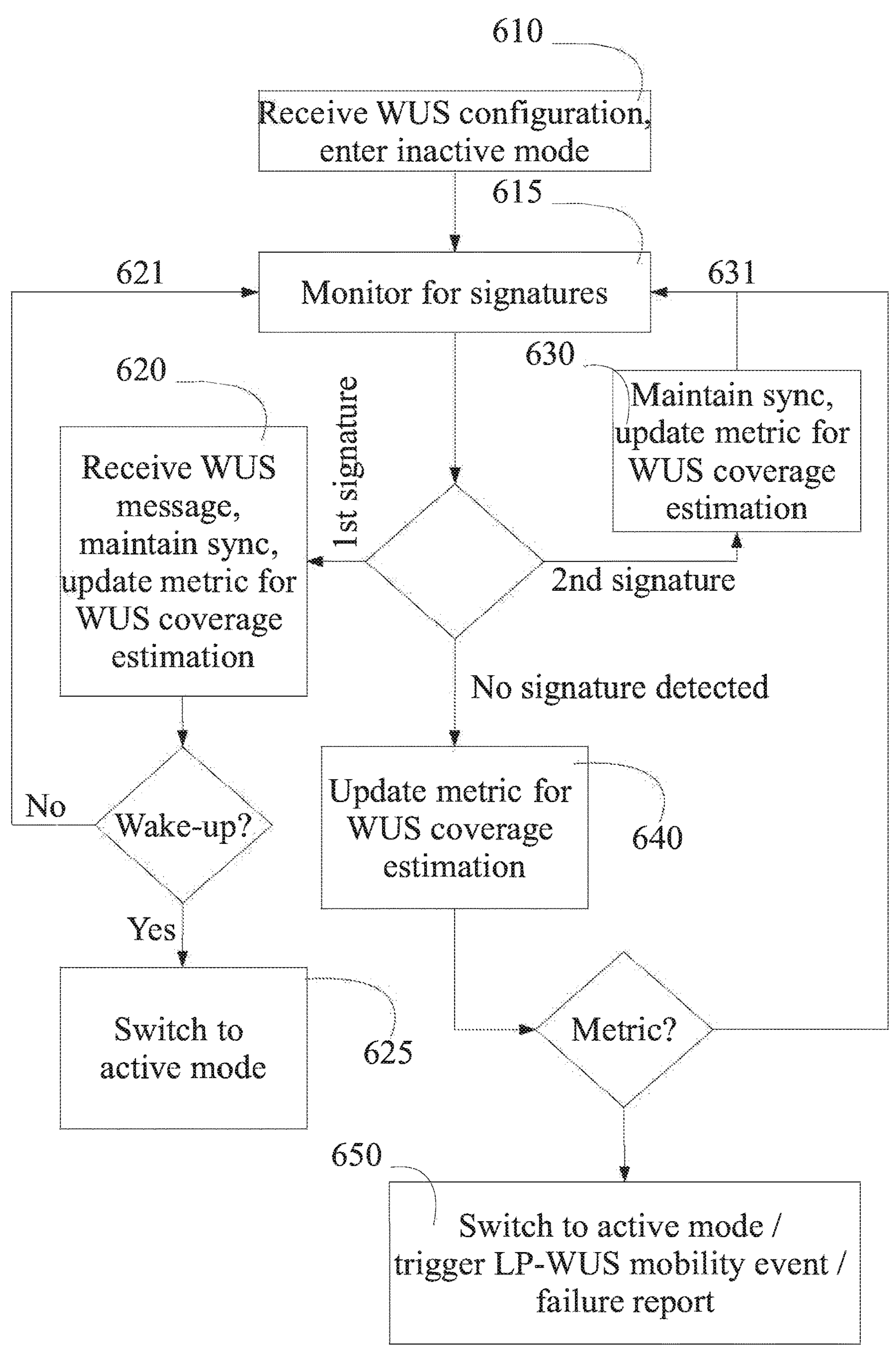
FIG. 6 shows, by way of example, a flowchart of a method.

FIG. 6 shows, by way of example, a flowchart of a method performed by UE. The UE may receive 610 LP-WUS configuration. The configuration may comprise, for example, configuration of LP-WUS occasion, resources, signatures etc. Alternatively, signatures may be predefined by a relevant communication standard. LP-WUS configuration may be received via broadcast signalling (system information blocks, SIBs) and/or via dedicated signalling (RRC reconfiguration or RRC release message).

The UE may enter 610 into an inactive state, or WUS mode, or sleep state or sleep mode, or RRC_inactive state or OFF state or OFF mode or inactive mode. “Inactive” is not supposed to mean that the UE would not perform any actions. In this mode, the UE may monitor WUSs, for example. For example, inactive mode or state may be referred to as a WUS monitoring mode or state. In inactive mode, the main radio of the UE may be off and the UE may monitor WUS with a LP-WUR, for example.

The UE may monitor 615, in the inactive mode, LP-WUS occasions for detecting a transmission on the occasion. For example, the UE may monitor for the configured or pre-configured LP-WUS signatures on the occasions. The UE may monitor for signatures, and tries to detect a first signature or a second signature. For example, an opportunity for detecting the first signature may be provided for each LP-WUS occasion; and an opportunity for detecting the second signature may be provided for a pre-defined subset of the LP-WUS occasions.

The UE may detect the first signature, or a WUS signature, indicating presence of at least one LP-WUS message in the transmission. Based on or in response to detecting the first signature, the UE monitors and tries to detect and, possibly, decode the LP-WUS message in a remaining portion of the LP-WUS occasion.

The UE may receive 620 at least one LP-WUS message. If the LP-WUS message indicates that the UE needs to wake-up, the UE may switch 625 to active mode or NR mode. For example, the UE may turn on the main radio.

In case the LP-WUS message does not indicate a need to wake-up for the UE, the UE may continue 621 monitoring for signatures or transmissions on LP-WUS occasions in the inactive mode. LP-WUS occasions might not be dedicated for some specific UE. For example, the LP-WUS message may comprise wake-up instructions for some other UE monitoring the same LP-WUS occasion.

The UE may also update or maintain its synchronization based on the detected first signature, and possibly update a metric for LP-WUS coverage estimation. The metric may be used to estimate whether UE is within LP-WUS coverage.

Different metrics may be used for estimating whether UE is within LP-WUS coverage or not. The metric may be, for example, a ratio of detected and/or missed signatures within a time window of LP-WUS occasions, a timer from the last detected signature, a number of consecutive missed signatures, etc.

For example, UE may increase LP-WUS failure counter when UE misses both signatures (does not detect any signature) in the same LP-WUS occasion, and when counter reaches predefined value or threshold, the UE may take a corresponding action. For example, the UE may be configured to switch to active mode or NR mode, or trigger LP-WUS mobility event.

Alternatively, corresponding action(s) may be triggered after N consecutive failures or N failures within a certain predefined time period. N may be a predefined value or threshold.

The metric may depend on both of detecting and missing signatures, or only on missed signatures or on detected signatures (detecting either one of the signatures). The counter may be increased or decreased, depending on whether the signature is detected or missed.

The UE may detect the second signature, or a cellular signature, indicating absence of a LP-WUS message in the transmission. The UE may then ignore the remaining portion of the LP-WUS occasion. The UE may also update 630 or maintain its synchronization based on the detected first signature, and possibly update a metric for LP-WUS coverage estimation.

The UE may continue 631 monitoring for signatures or transmissions on LP-WUS occasions in the inactive mode.

It may happen that UE might not detect either of the first signature and the second signature. After non-detection of the first signature and the second signature, that is, after not detecting either of the signatures, the UE may update 640 the metric for LP-WUS coverage estimation. The non-detection may be determined by the UE, for example, based on a pre-defined time period of not detecting any signatures (or not receiving any LP-WUS messages). For example, a time period may be pre-defined, and after not detecting either of the signatures (or after not receiving any LP-WUS messages) for the pre-defined time period, the UE may determine that it has not detected either of the signatures and may update the metric accordingly. It may then depend on the value of the metric, or the state of the counter, how the UE is configured to proceed.

For example, if the number of missed signatures does not reach a predefined threshold of a counter, the UE may continue 631 monitoring for signatures.

If the UE detects, based on the metric for LP-WUS coverage estimation, that the UE is outside the LP-WUS coverage, the UE may switch 650 to active mode, and/or trigger a LP-WUS mobility event, and/or transmit a failure report to the network node. For example, the UE may prepare LP-WUS reception status report indicating that the UE is outside the LP-WUS coverage (has not received LP-WUS message(s) or signatures (either of the first signature or the second signature)), and transmit the report to the network node. The UE may temporarily turn the main radio on and transmit the report to the network node.

When the network node receives a report or indication that the UE is outside the LP-WUS coverage (has not received LP-WUS message(s) or signatures, e.g. for some pre-defined time), the network node may decide to instruct the UE to switch to active mode by transmitting the LP-WUS message to the UE. Alternatively, after transmission of the report, the UE may have remained temporarily in active state with main radio on to wait for network instructions. Thus, the UE may alternatively receive network instructions through the main radio. For example, the network node may configure the UE with LP-WUS configuration with wider coverage.

In at least some embodiments, the UE may, after not detecting any of the first signature or the second signature, try still to receive the LP-WUS message.

The signature pair may provide regular synchronization for LP-WUR oscillators, which may have relatively poor quality. The UE may maintain or update its synchronization after detecting the first signature or the second signature, so also when there is no actual wake-up signalling.

Referring back to FIG. 5, the network node may transmit the first signature 510 over a different carrier frequency or bandwidth part than the at least one LP-WUS message 520. This way, better coverage may be ensured for the signature part, and the network may better reach the UE. For example, lower carrier frequency may be used for the signature part to enable detection of the signature in wider cell area.

For example, the UE may successfully receive the first signature, but fail to receive the LP-WUS message. If UE receives a pre-defined number of first signatures, without receiving the actual LP-WUS message, the UE may be configured to switch to active mode.

The network node may be configured to transmit the same second signature on the LP-WUS tracking area. When LP-WUS resources are synchronized across the tracking area, LP-WUS cell edge coverage may be improved through more reliable synchronization.

The network node may be configured to transmit different second signatures on different LP-WUS tracking areas. When the LP-WUS resources are synchronized across or within each area, probability of failed detection may be increased for UEs at or close to the coverage edge. Increased failed detection rate may indicate to the UE the loss of LP-WUS coverage.

It may be determined that predefined LP-WUS transmissions, e.g. only predefined LP-WUS transmissions, e.g. every $10^{th}$ periodic LP-WUS transmission, have two semi-static candidates for the LP-WUS signatures. Thus, those predefined LP-WUS transmission may comprise either the first signature or the second signature. The remaining LP-WUS transmissions may have only one semi-static candidate for the LP-WUS signature, that is, the first signature. When the network node has no WUS message to be transmitted, it may leave resources allocated for the WUS signature unused. This configuration may minimize the network energy consumption while providing opportunities for periodical LP-WUS synchronization. This option may be used, for example, in the cases when the cell load is small, and there is no reason to send cellular data in each DL slot.

The network node may configure the cell and/or tracking area specific resources reserved for LP-WUS messaging as rate matching resources for other UEs that are in connected mode. The rate matching resources are resources that are not used or are not valid within the resources of physical downlink shared channel (PDSCH). In other words, PDSCH is rate matched around the resources allocated for LP-WUS messaging. Configuration may be performed explicitly, e.g. by RRC reconfiguration, or implicitly so that the UE may read the resources used for the LP-WUS signals from system information block (SIB) and apply those resources as rate matching resources when receiving PDSCH or channel state information reference signal (CSI-RS), for example.

When the transmission comprises the second signature, the network node may indicate to the UEs in connected mode, that the rate matching resources, i.e. the resources allocated for the LP-WUS messaging, are actually applicable to PDSCH (NR DL transmission), if the PDSCH allocation overlaps with the resources allocated for the LP-WUS messaging. This indication may be performed via downlink control information (DCI), for example.

In case more than one LP-WUS signature message is transmitted, any of LP-WUS signature messages may include wake up message to make wake-up adjustment in time for corresponding cell resources where it was transmitted. This provides better synchronization/adaptation for receiver device in time domain for initial access in given time and frequency resources. Multiple of WUS carrier frequencies may be used in different transmitting site locations or with carrier frequencies or with different configured connection requirements compared to previous configuration. For example, PRACH transmit time may be adjusted with this type of LP-WUS signature message. If lower responses requirement is needed, wake-up adjustment in time can be transmitted in any of WUS messages. Maximum number of LP-WUS signature messages may be specified in initial connection configuration. For example, WUS signature part may be included together with WUS message part(s) of LP-WUS occurrence.

Method(s) as disclosed herein enable reducing the overhead induced by frequency LP-WUS signalling, enabling in turn low latency for waking up devices in inactive mode to active mode, while facilitating acceptable LP-WUS false alarm rate. LP-WUS message resources may be used for cellular NR traffic when there are no LP-WUS messages in the LP-WUS occasion. In addition, the second signature or cellular signature may be utilized to maintain synchronization for the LP-WUS receivers.

In case the signatures would be erroneously detected, the consequences remain reasonable. For example, UE may erroneously detect the first signature (wake-up message present) as the second signature (wake-up message absent). Because of this, the wake-up latency may be increased as gNB may need to retransmit the LP-WUS message.

As another example, UE may erroneously detect the second signature (wake-up message absent) as the first signature (wake-up message present). Then, UE will try to detect or monitor the LP-WUS message in vain. However, consequences are not severe because the network node did not initially want to wake up the UE, as it sent the second signature.

Figure 7:
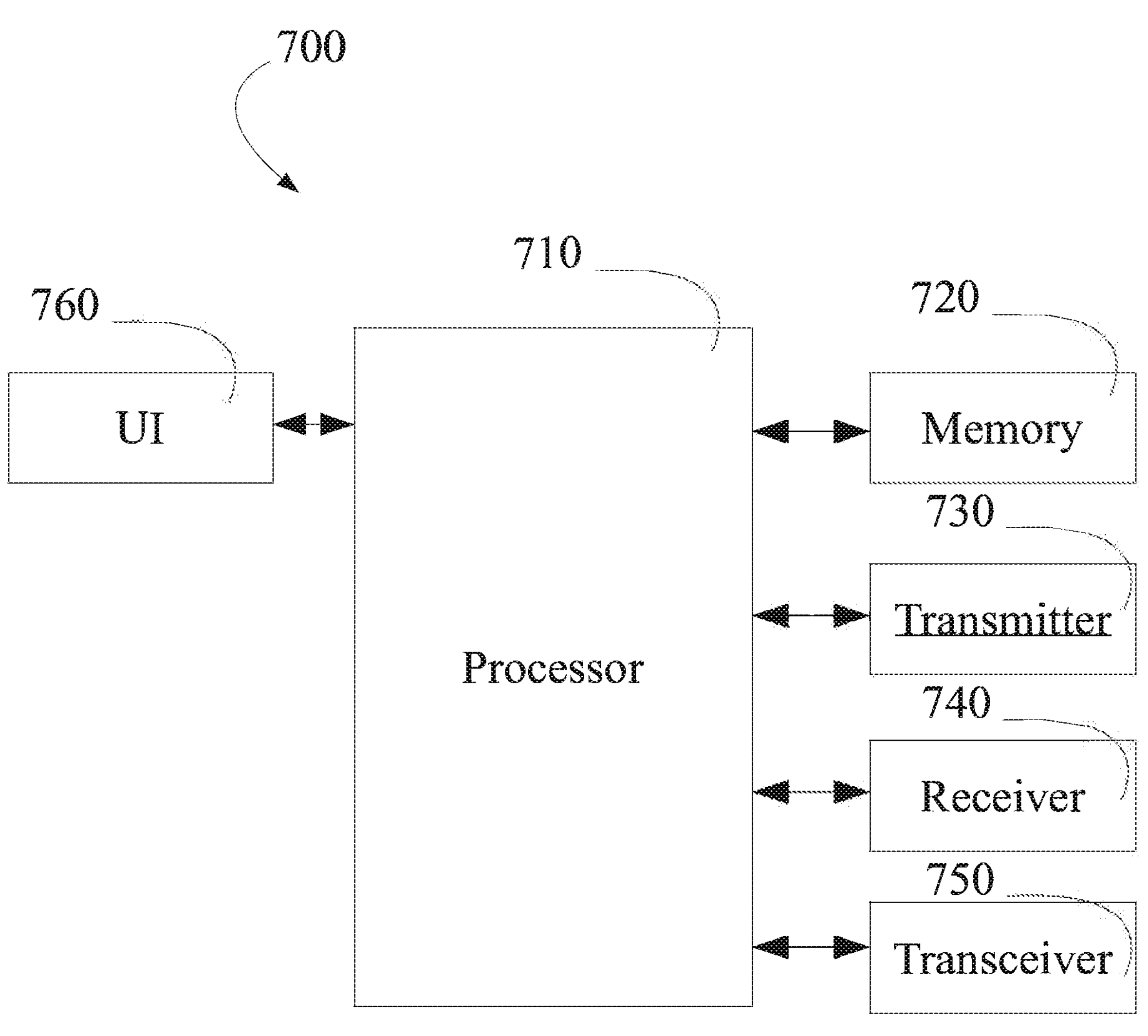
FIG. 7 shows, by way of example, a block diagram of an apparatus.

FIG. 7 shows, by way of example, a block diagram of an apparatus capable of performing the method(s) as disclosed herein. Illustrated is device 700, which may comprise, for example, a mobile communication device such as UE 110, 120 of FIG. 1 or device 230 of FIG. 2; or a network node, e.g. gNB, e.g. a base station 130 of FIG. 1. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a user equipment or network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise instructions, such as computer instructions or computer program code, that processor 710 is configured to execute. When instructions configured to cause processor 710 to perform certain actions are stored in memory 720, and device 700 overall is configured to run under the direction of processor 710 using instructions from memory 720, processor 710 and/or its at least one processing core may be considered to be configured to perform said certain actions. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Processor 710, memory 720, transmitter 730, receiver 740, NFC transceiver 750, UI 360 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected.

The term "non-transitory" as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The invention claimed is:

1. An apparatus, comprising:

at least one processor; and at least one memory storing instructions that, when executed by the at least one processor, cause the apparatus at least to perform:

monitoring, in an inactive mode, low power wake-up signal (LP-WUS) occasions for detecting a transmission on a LP-WUS occasion, the transmission comprising:

a first signature indicating presence of at least one LP-WUS message in the transmission and the at least one LP-WUS message; or a second signature indicating absence of a LP-WUS message in the transmission, wherein, in a case where the second signature is received, performing updating synchronization of the apparatus based on the second signature;

based on detecting, based on a metric for LP-WUS coverage estimation, that the apparatus is outside the LP-WUS coverage, the apparatus is caused to perform: switching to active mode;

triggering a LP-WUS mobility event; and indicating to a network node that the apparatus has not received LP-WUS message(s) or either of the first signature and the second signature; and wherein the transmission comprises the first signature, the apparatus is caused to perform:

detecting the first signature; and based on detecting the first signature;

monitoring the at least one LP-WUS message in a remaining portion of the LP-WUS occasion;

updating synchronization of the apparatus based on the first signature and the at least one LP-WUS message;

receiving the at least one LP-WUS message instructing to wake-up; and switching to an active mode.

* * * * *